April 24, 1934.  A. B. CASPER  1,956,270
APPARATUS FOR TESTING AND ADJUSTING SHOCK ABSORBERS
Filed March 26, 1932  3 Sheets-Sheet 1
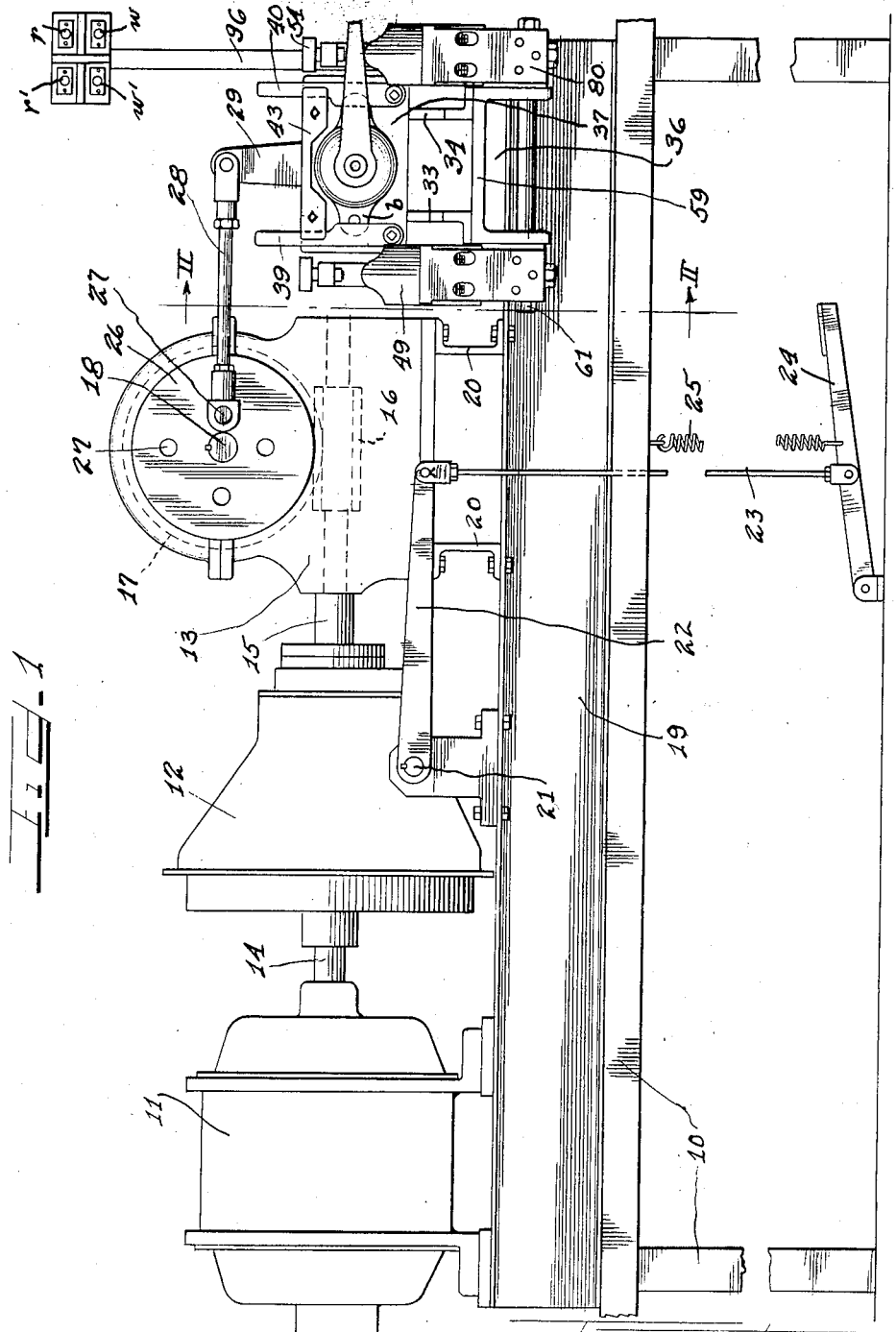
Inventor
Anthony B. Casper.
by Charles Hill
Attys.

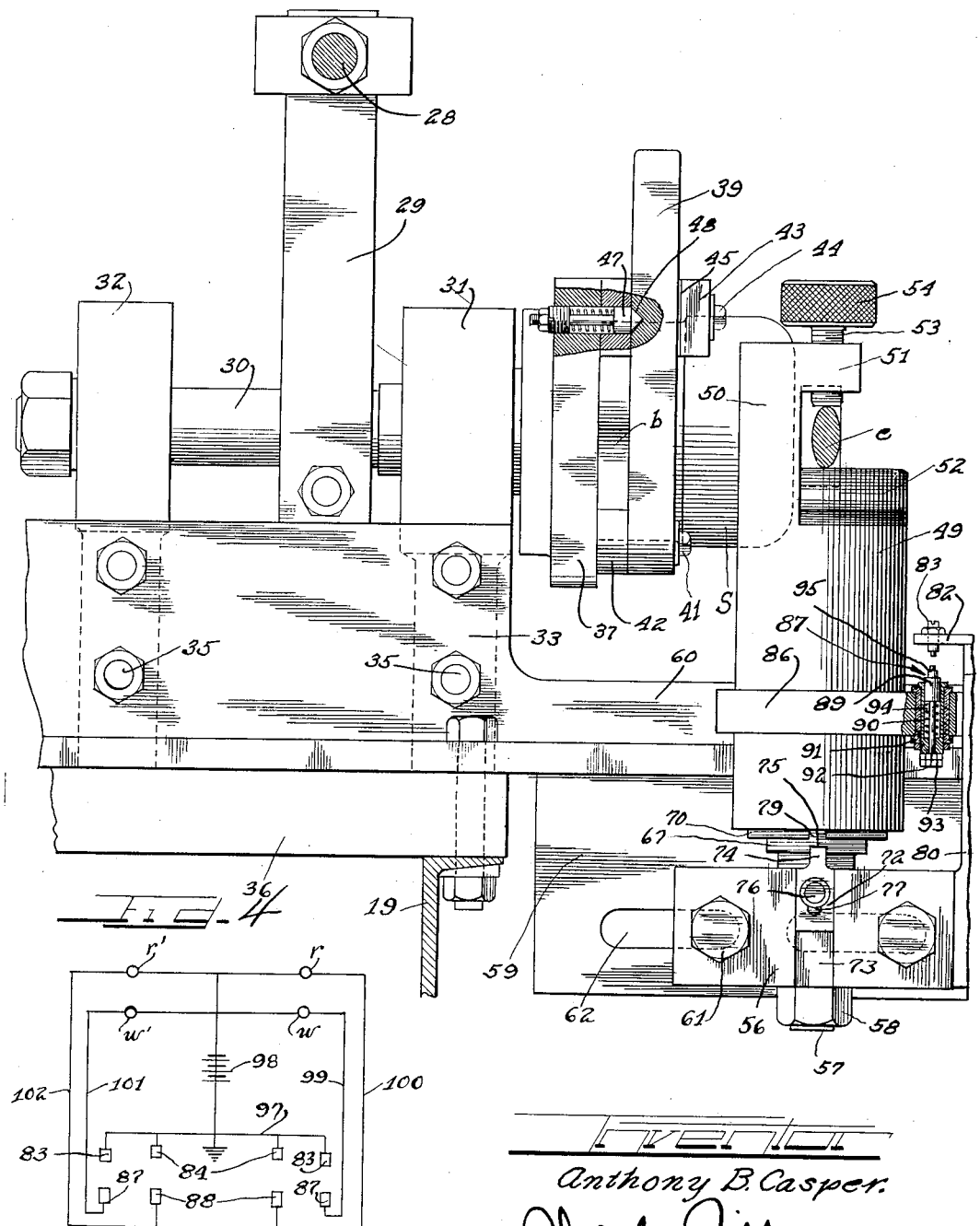

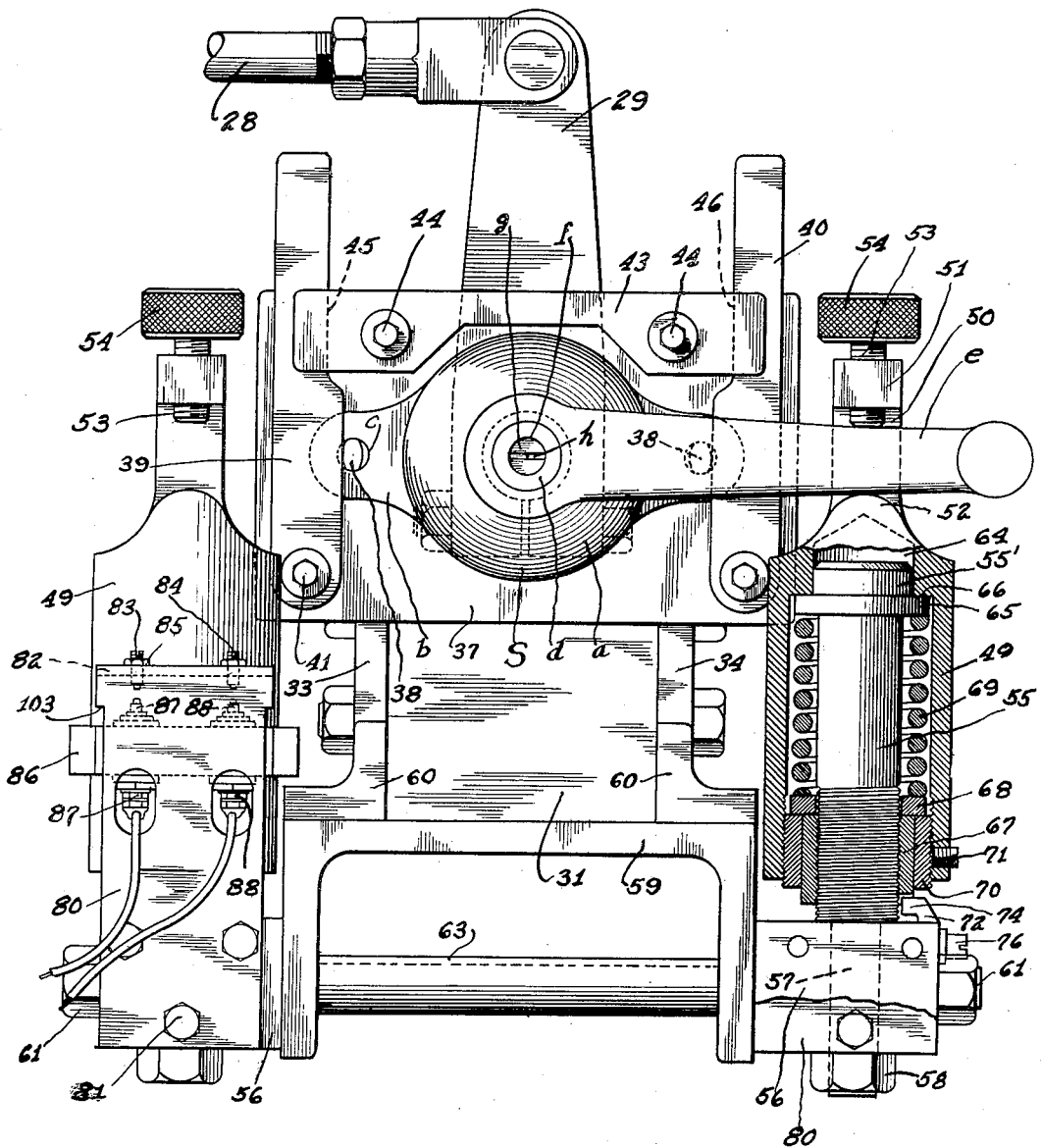

Patented Apr. 24, 1934

1,956,270

UNITED STATES PATENT OFFICE 1,956,270

APPARATUS FOR TESTING AND ADJUSTING SHOCK ABSORBERS

Anthony B. Casper, Buffalo, N. Y., assignor to Houde Engineering Corporation, Buffalo, N. Y., a corporation of New York Application March 26, 1932, Serial No. 601,389

8 Claims. (Cl. 73—51)

My invention relates to an improved machine or apparatus for the testing and adjusting of shock absorbers, particularly those of the hydraulic type, before they are applied to the vehicle which they are to serve.

It has been the practice of shock absorber and automobile manufactures, before mounting shock absorbers on automobiles, to set the fluid flow controlling valves, such setting being usually determined from previous tests or from experience gained by observation of the performance of similar shock absorbers while in service on automobiles. One method of testing and setting the shock absorbers was to apply a constant torque to the shock absorber shaft and make proper adjustment so that the resistance of the absorbers would be sufficient to allow the applied torque to move the shaft through a constant angle in a required time. These procedures referred to were usually resorted to where the fluid flow controlling valves were only manually adjustable.

In the more recent or automatic type of hydraulic shock absorbers the maximum resistance to be adjusted for depends upon the maximum angular velocity at which the shock absorber shaft is turned when the absorber is in service on a vehicle, and the ratio of resistance to velocity is not a constant. In order to set this new type of shock absorber, it is therefore necessary to make the primary adjustment for resistance while the absorber is being oscillated at the angular velocity at which it will operate when on the automobile, and the usual method and procedure referred to for setting shock absorbers would not apply for this automatic type of shock absorber.

An important object of my invention is to provide a machine or apparatus by means of which a shock absorber may be oscillated at a frequency which is in accord with the critical number of oscillations per minute to which the shock absorber will be subjected when in service on the vehicle, and while the shock absorber is being thus oscillated, to adjust and set the fluid flow control valve for the proper angle of oscillation so that the maximum resistance will synchronize with the maximum angular velocity when the shock absorber is applied to the vehicle and is in service.

The springs on a vehicle are always under a normal load whose extent is dependent upon the particular type or make of vehicle, and the shock absorbers are subjected to and must take care of this normal load on the spring. Another important object of my invention is therefore to provide a machine or apparatus in which a spring is pre-loaded in accordance with the normal loading of the springs on the vehicle to which a shock absorber is to be set and adjusted for, and in which the shock absorber is oscillated against the resistance of such pre-loaded spring, and adjustment is made during such oscillation at the proper frequency for the required maximum angle of oscillation.

A further important object is to provide a machine or apparatus in which the body of a shock absorber to be set and adjusted may be oscillated at the proper frequency and the shock absorber arm applied to the preloaded spring so that the valve which is to be set and adjusted will practically be at rest and adjustment and setting can therefore be made with greater ease and accuracy.

Another important object is to provide indicating means, in the form of visible or audible devices preferably electrically controlled, which will advise the operator of the machine as soon as the adjustment and setting is that for the required angle of oscillation.

Still a further object is to provide a machine or apparatus in which shock absorbers may be quickly mounted, in which setting for the desired frequency of oscillation may be readily and quickly made, and proper adjustment and setting of the valve will be assured.

Referring to the drawings, Figure 1 is a front elevation of the testing apparatus with a shock absorber mounted thereon;

Figure 2 is an enlarged section on plane II—II of Figure 1;

Figure 3 is an enlarged front view of the shock absorber supporting, oscillating, and checking mechanism; and Figure 4 is the circuit diagram for the machine operation indicating means.

A table structure 10 is provided for supporting the apparatus parts which include a driving motor 11, a clutch 12, and reducing gearing structure 13, the motor shaft 14 connecting with one element of the clutch whose other element is connected by shaft 15 with the reducing gearing structure. The reducing gearing may comprise a worm 16 driven by the clutch shaft 15, and a worm wheel 17 on the horizontal shaft 18. The various parts of the apparatus may be mounted on one or more metal beams 19 secured on the table 10 and the reducing gearing structure may be supported on cross beams 20 secured to the beams 19.

The clutch operating shaft 21 has secured thereto a lever 22 whose end is connected by a rod 23 with the foot lever 24 which is normally held up by a spring 25. Upon depression of the foot lever, the clutch will be operated to connect the motor 11 with the reducing gear train so that the shaft 18 will be rotated at the desired speed. At its front end this shaft 18 supports a crank disk 26 which has a number of holes 27 therethrough at various distances from the shaft axis for detachably receiving a crank pin 27. The crank pin receives one end of a connecting rod 28 whose other end is connected with the outer end of an arm 29 which is secured to a cross shaft 30 journalled in front and rear bearings 31 and 32. These bearing structures are supported by cross beams 33 and 34 to which they may be secured as by means of bolts 35, the beams being rigidly secured to the beams 19, a spacer block 36 being shown interposed, as clearly shown in Figure 2.

Secured to the front end of the shaft 30 is a head or frame 37 on which are mounted the shock absorbers to be tested and adjusted. The head is shown of rectangular shape and presenting a front vertical surface against which the shock absorbers S are seated. The machine shown is designed particularly for testing shock absorbers of the so-called "Houdaille" type which comprise a cylindrical housing $a$ from whose base ears $b$ extend laterally and have the bolt holes $c$ by means of which the housing may be secured usually to the chassis of a vehicle. The shaft $d$ extending axially through the housing for connection with the piston structure therein has secured to its outer end the arm $e$ which is usually connected with the vehicle axle.

Extending forwardly from the front face of the supporting head 37 are posts 38 which receive the bolt holes $g$ when the shock absorber housing is applied to the head 37, the shock absorber being thus held against lateral or vertical displacement on the head. To lock the shock absorber rigidly to the head against axial displacement thereon, the clamping levers 39 and 40 are provided, these levers being pivoted at their lower ends on studs 41 extending from the head 37 and with spacers or washers 42 interposed, the thickness of these spacers being substantially equal to the thickness of the ears $b$ on the shock absorber so that when the levers are swung inwardly they will engage with and in front of the ears to thereby hold the shock absorber against axial displacement.

A cross bar 43 is secured to the head 37 at the top thereof by bolts or screws 44, the bar at its ends having the recesses 45 and 46 for receiving the upper ends of the levers 39 and 40 respectively after they have been swung into position to secure the shock absorber to the head 37. Behind each of the recesses a spring pressed plunger or detent 47 may be provided for projecting its conical end into the recess 48 of the respective lever, these detents yieldingly locking the levers in their clamping position.

I shall now describe the mechanism for determining the adjustment and setting of the shock absorber. The mechanism shown comprises a cylindrical housing 49 having the upward extension 50 from its top with the forwardly extending projection 51 thereon to provide the passageway between the projection and the top of the housing for receiving the shock absorber arm $e$. The top of the housing has the convex abutment 52 thereon for the arm and in the projection 51 is threaded the screw 53 forming the upper abutment for the arm, this abutment screw being adjustable by means of its knurled head 54.

The housing 49 receives a post 55 which is supported on a block 56, the post having the reduced lower end 57 extending through the block and being threaded to receive a nut 58 so that the post may be held securely seated on the block. To support the block 56 I have shown a length of channel beam 59 secured with its base against the front reduced ends 60 of the angle bars 33 and 34 which support the bearing structure for the shaft 30 which carries the head 37, the bars being cut away below the head to leave ample clearance space for oscillation and operation of the head when the machine is operated. The block 56 is secured against the adjacent flange of the supporting beam 59 by means of suitable bolts 61 and in order to effect forward and rearward adjustment of the block and the arm-engaging housing 49 thereon, the flange of the beam has slots 62 through which the bolt 61 extends.

There are right hand and left hand shock absorbers for vehicles and in order that either type may be accommodated a second adjustment and setting determining mechanism may be provided and supported by a block 56 at the left side of the head 37, the construction, arrangement and operation of this mechanism on the left side being exactly the same as on the right side. In Figure 3 the arm of the shock absorber is associated with the adjustment determining mechanism on the right side of the head 37 while on Figure 2 the shock absorber arm is shown in engagement with the left side adjustment determining mechanism. Where two such mechanisms are provided, the supporting blocks 56 therefor may be secured in common by long bolts 61 extending through both flanges of the supporting bracket 59, with spacer tubes 63 on the bolts between the bracket flanges.

Each housing 49 has the guide passage 64 in its head of reduced diameter for receiving the head 55' on the post 55, an abutment washer 65 receiving the post below its head and the housing having the annular shoulder 66 forming an abutment for the washer. The lower section of the post 55 is threaded to receive a collar 67 which forms an abutment for the seat washer 68, a compression spring 69 encircling the post between this washer and the upper washer 65. Surrounding the collar 67 and slidable thereon is the annular abutment nut 70 which has threaded engagement with the interior threading at the lower end of the housing 49 and which forms the abutment for the seat washer 68 when the spring is compressed during operation of the apparatus. By means of a set screw 71 the abutment nut or ring 70 can be locked in adjusted position. To lock the collar 67 in adjusted position I have shown a stop plate 72 vertically reciprocable in a channel 73 in the block 56, the plate having the tooth 74 at its upper end for engagement in any one of the notches 75 in the lower edge of the collar to thus lock the collar in adjusted position, these notches serving also for the application of a suitable tool for turning the collar. A securing screw 76 is provided for the locking plate which has the slot 77 through which the screw extends so that when the screw is loosened, the plate may be shifted upwardly to lock the collar 67 or may be shifted downwardly to release the collar for adjustment. The annular nut 70 may also be provided with notches 79 for a proper tool for readily turning the nut for adjustment purposes.

When the crank disc 26 is rotated, the head 37 and the shock absorber housing secured thereto will be oscillated but the shock absorber arm will be held by its engagement with the abutments 52 and 53 on the housing structure 49. The force tending to swing the shock absorber arm is dependent upon the resistance to the flow of the fluid within the shock absorber from one side of the piston structure to the other and this resistance is usually greater for the rebound stroke, that is, while the chassis moves away from the vehicle axle. The shock absorber is set in the testing apparatus so that its arm will move in rebound direction to exert upward pressure tending to raise the housing structure 49 against the resistance to compression of the spring 69, upward movement of the housing being transmitted to the annular nut 70 and to the seat washer 68 and thus to the spring whose upper end abuts against the washer 65 on the stationary post 55. The lesser downward pressure of the shock absorber arm will tend to shift the housing structure 49 downwardly, such movement moving the washer 65 downwardly to compress the spring whose lower end is then held by the seat washer 68 abutting against the collar 67 on the post. It is the rebound action which is of the greater importance and for which proper adjustment should be made on the shock absorber for the proper resistance to flow of the fluid through the release passageway.

The spring 69 should be dimensioned and should be adjusted to imitate as closely as possible the condition and functioning of the vehicle spring with which an adjusted shock absorber is to be associated. The vehicle springs have a normal set under a normal load and therefore the spring in the testing apparatus is preferably given a corresponding normal set or preloading. This can be accomplished in any suitable manner. For example, before the shock absorbers are applied in the apparatus, a weight beam can be applied with its end under the abutment screw 53 and the housing 49 moved upwardly for the desired pre-loading of the spring. After the housing has thus been moved up and the spring properly pre-loaded, the collar 67 is turned up to re-engage the seat washer 68 and to take up the spring compression and then the weight lever is removed and the annular nut 70 is then turned up in the housing 49 into re-engagement with the seat washer 68. The resistance of the spring is now substantially constant and the shock absorber is tested by measuring the additional deflection of the spring due to the oscillation imparted to the lever as the shock absorber body is oscillated.

Different types of vehicle springs have different vibration characteristics and the frequency of oscillation of the shock absorber body while in the testing apparatus should therefore be in accord with the spring vibration characteristics, and adjustment of the shock absorber should be made while it is being oscillated at the angular velocity at which it will operate when installed on the vehicle. The shock absorber should also be oscillated through the required angle at the critical number of oscillations per minute at which it will operate when installed on the vehicle.

The means for determining when the shock absorber has been properly set to give the proper resistance characteristics when installed on the vehicle, will now be explained. Electrical indicating means are preferably provided for accurately indicating when the adjustment or setting is correct for the proper shock absorber resistance. In front of each housing structure 49 is a supporting plate 80 secured by screws 81 to the block 56 which supports the corresponding post 55. At its upper end each plate has the horizontal wall 82 extending therefrom toward the corresponding housing 49 and threading through this wall are two contact terminal screws 83 and 84 each of which may be locked in adjusted position by a lock nut 85. Secured on each housing 49 a distance below the corresponding contacts 83 and 84 is a collar 86 carrying two contact structures 87 and 88 in vertical alignment respectively with the contact screws 83 and 84. These lower contacts are yielding, each comprising a head 89 reciprocable vertically in a barrel 90 supported by the collar 86 but insulated therefrom an insulating bushing 91. A stem 92 extends downwardly from each head 89 and is threaded to receive adjusting nuts 93, the spring 94 tending to shift the head 89 upwardly which upward movement is restained by the nuts 93. Each head has a contact point 95 and when the housing structure 49 is raised by the pressure of a shock absorber lever the contact structures 87 and 88 are carried toward the contact screws 83 and 84 and when a lower contact engages with the corresponding upper contact an indicating circuit will be closed. Indicating means in the form of lamps may be used. I have shown two lamps $w$ and $r$ for association with the setting mechanism at the right side of the head 37 and two lamps $w'$ and $r'$, associated with the setting mechanism at the left side of the head 37 and the lamps are shown supported on a suitable bracket 96 secured to and extending upwardly from the table 10 where they can be readily observed by the operator of the machine.

Figure 4 shows the circuit arrangement. The contacts 83 and 84 on both testing structures are all connected with the framework of the machine, this being indicated by the ground connection 97. A battery 98 or other suitable source of current has one terminal connected to the frame 97 and its other terminal is connected with one terminal of each of the various lamps. The other terminal of the lamp $w$ is connected by conductor 99 with the contact structure 87 on the spring housing structure 49 while the lamp $r$ is connected by conductor 100 with the other terminal structure 88 on this housing. The lamps $w'$ and $r'$ are connected by conductors 101 and 102 respectively with the terminal structures 87 and 88 on the housing structure for the testing apparatus at the left of the shock absorber carrying head 37. It will be noted that the gap between the terminal screw 84 and the respective terminal structure 88 on the housing 49 is somewhat greater than the gap between the contact screw 83 and the terminal structure 87. With this arrangement, as the housing 49 is moved upwardly with the shock absorber arm, its contact structure 87 will engage with the contact 83 before its contact structure 88 engages the contact 84. The engagement of the contact 87 with the contact 83 closes the indicating circuit. With the arrangement shown in Figure 3 engagement of the contacts 87 and 83 will close the circuit through the lamp $w$ to indicate to the operator that the shock absorber has been properly adjusted and set for the proper resistance. If the housing 49 is moved up further and its contact 88 engages the contact 84 the circuit for the lamp $r$ will be closed and this will indicate to the operator that the resistance is too great in the shock absorber, and the operator then adjusts for reduction of this resistance until only the lamp $w$ is illuminated. The operator can thus very accurately establish the proper setting and preferably the lamps are of different colors. For example, the lamps $w$ and $w'$ may be white and the lamps $r$ and $r'$ may be red.

Where the shock absorber tested is of the automatic type as, for example, the shock absorber disclosed in the application of Fox and Ullery, Serial No. 617,614, filed June 16, 1932, the resistance adjusting valve is readily accessible for adjustment. In this type of shock absorber the valve is located within the bore $f$ of the shaft $d$ and the adjusting head $g$ for the valve structure is provided with a screw driver slot $h$. While the shock absorber body is being oscillated the arm $e$ will be practically at rest and the operator can readily turn the head $g$ for adjustment of the shock absorber resistance and as soon as the white lamp illuminates the operator knows that the proper setting has been reached. The operator may overturn the head $g$ until the red lamp illuminates and then return the head until only the white lamp remains illuminated and he is then assured that the proper setting has been made. When the shock absorber is now applied to a vehicle it will be in condition to synchronize with the vehicle spring characteristics and to produce the most efficient shock absorber action.

To prevent injury to the contacts, the upward movement of the spring housing 49 is limited. As shown, the plates 80 at their upper ends have abutment shoulders 103 which are engaged by the collar 86 on the housing to stop further movement of the housing after the circuit contacts have functioned.

When assembling the housing 49 the spring is preferably pre-loaded to a load slightly lower than that required for setting the shock absorber and then when the shock absorber body is oscillated in the machine the lever pulls upwardly on the housing to further compress the spring if the torque resistance of the absorber is sufficient. If not, adjustment is made of the valve mechanism by the operator until the white lamp remains illuminated.

The motor 11 is adapted to run at constant speed and when the operator depresses the foot lever 24 the clutch 12 will connect the motor for driving the reducing gearing mechanism and then the crank disc 26 will be rotated and the supporting head 37 with the shock absorber body thereon will be oscillated at constant speed as long as the foot lever is depressed and during this time the operator adjusts and sets the shock absorber valve. After such adjustment and setting, the clamping levers 39 and 40 are swung outwardly to release the shock absorber from the head 37 and the shock absorber is then ready for installation on the vehicle for which it was adjusted.

Owing to the ease and rapidity with which shock absorbers to be tested may be mounted in my improved apparatus, and the speed and accuracy with which adjustment may be made while the machine is running, the cost of testing and adjusting is reduced to a minimum.

I do not desire to be limited to the exact construction, arrangement and operation shown and described as changes and modifications may be made without departing from the scope of the invention as outlined in the appended claims.

I claim as follows:

1. In apparatus for testing and adjusting shock absorbers comprising relatively rotatable elements, the combination of a support for one of said elements, means for rotatably oscillating said support and element thereon on a fixed axis, and means providing a fixed load to be applied to the other element to resist movement thereof during oscillation of the supported element and against which load adjustment is to be made during such oscillation of the shock absorber internal resistance until said load is counterbalanced.

2. In apparatus for testing and adjusting shock absorbers comprising relatively rotatable elements, the combination of a support for one of said elements, means for rotatably oscillating said support and element thereon on a fixed axis, and means providing a fixed load to be applied to the other element to resist movement thereof during oscillation of the supported element and against which load adjustment is to be made of the shock absorber internal resistance until said load is counterbalanced, and indicating means for indicating when counterbalance has been reached.

3. In apparatus for testing and adjusting shock absorbers comprising relatively rotatable elements, the combination of a support for one of said elements, means for rotatably oscillating said support and element thereon on a fixed axis, and means providing a fixed load to be applied to the other element to resist movement thereof during oscillation of the supported element and against which load adjustment is to be made of the shock absorber internal resistance until said load is counterbalanced, and electrical means for indicating when proper adjustment has been made, including an electrical circuit controlled by the movement of said loaded element.

4. In apparatus for the testing and adjusting of shock absorbers which comprise two relatively rotatable elements and adjustable means for resisting such relative movement, the combination of a support for one of the shock absorber elements and means for rotatably oscillating said support with said element thereon on a fixed axis, and spring means for application to the other shock absorber element and forming a predetermined resistance to movement of said element and said resistance determining the amount of required manual adjustment of the resistance means between said elements.

5. In apparatus for the testing and adjusting of shock absorbers comprising two relatively rotatable elements and adjustable means for resisting such relative movement, the combination of a support for one of the shock absorber elements and means for rotatably oscillating said support and element on a fixed axis and at a predetermined frequency and through a predetermined angle, a preloaded spring adapted for connection with the other shock absorber element to resist oscillation thereof during oscillation of the oscillated element, and electrical means for indicating a predetermined additional deflection of said spring as adjustment is made of the means which resists relative movement of the shock absorber elements.

6. In apparatus for the testing and adjusting of shock absorbers which comprise two relatively rotatable elements and adjustable means for resisting such relative movement, the combination of a support for one of said elements and means for rotatably oscillating said support and element thereon on a fixed axis, a preloaded spring adapted for connection with the other shock absorber element to resist movement thereof, and means for indicating the deflection of said spring due to the oscillation imparted to said other element by the oscillating element through the means resisting relative movement between said elements.

7. In apparatus for the testing and adjusting of vehicle shock absorbers which comprise two relatively oscillatable elements and adjustable resistance means connecting said elements to determine the shock absorbing strength, the combination of a support for one of said elements and means for oscillating said support with the element thereon at a predetermined frequency and angle, a preloaded spring, an abutment housing for said spring adapted for connection with the other shock absorber element, means whereby said spring will resist movement of said housing in either direction by said other shock absorber element, said spring serving as a load to which the shock absorber strength is to be adjusted, and means indicating the deflection of said spring to thereby determine when adjustment has been made for the desired shock absorber strength.

8. In apparatus for testing and adjusting of vehicle shock absorbers of the "Houdaille" type which comprise a fluid containing housing, a piston element within the housing for displacing the fluid, a lever arm extending from the piston, by-passageway for the flow of resistance fluid from one side of the piston to the other, and a valve for adjusting the by-passageway, the combination of a shaft having a supporting head thereon, means for securing a shock absorber housing to said head with its axis coincident with the shaft axis, means for oscillating said shaft at a predetermined frequency and angle, a supporting post, a frame guided on said post, a preloaded compression spring abutting said post and frame, said frame being adapted to receive the piston lever arm and said spring resisting movement of said frame by said lever during oscillation of the shock absorber housing, the resistance of said spring being proportionate to the load to which the shock absorber will be subjected when in service, and means for indicating the movement of said frame by said lever and consequently the degree of deflection of said spring as adjustment is made of said by-passageway by said valve and whereby proper adjustment of the valve is determined.

ANTHONY B. CASPER.